(12) United States Patent
Sun (10) Patent No.: US 7,881,474 B2
(45) Date of Patent: Feb. 1, 2011

(54) SYSTEM AND METHOD FOR SECURE WIRELESS MULTI-HOP NETWORK FORMATION

(75) Inventor: Sheng Sun, Kanata (CA)

(73) Assignee: Nortel Networks Limited, Mississauga, Ontario (CA)

( * ) Notice: Subject to any disclaimer, the term of this patent is extended or adjusted under 35 U.S.C. 154(b) by 815 days.

(21) Appl. No.: 11/826,674

(22) Filed: Jul. 17, 2007

(65) Prior Publication Data

US 2008/0016338 A1  Jan. 17, 2008

Related U.S. Application Data

(60) Provisional application No. 60/807,567, filed on Jul. 17, 2006.

(51) Int. Cl.
*H04K 1/00* (2006.01)
*H04L 9/00* (2006.01)

(52) U.S. Cl. .................. 380/270; 380/277; 713/168
(58) Field of Classification Search .............. 380/270, 380/277–278, 281–285; 713/168–171, 175; 726/2–6
See application file for complete search history.

(56) References Cited

U.S. PATENT DOCUMENTS 7,590,589 B2 * 9/2009 Hoffberg ...................... 705/37
2004/0044727 A1 * 3/2004 Abdelaziz et al. ........... 709/203

\* cited by examiner

*Primary Examiner*—Hosuk Song (57) ABSTRACT

The present invention provides methods and devices for a security architecture for use in wireless multi-hop networks. A method for implementing pair-wise encryption key establishment, network node authentication and determining tunnel encryption keys is provided in a following manner. In a multi-hop wireless network including a plurality of network nodes, pair-wise security is established between pairs of neighboring network nodes of the plurality of network nodes. For example, pair-wise security is established in the form of temporal pair-wise encryption keys. Following establishment of pair-wise security between pairs of neighboring network nodes, for a pair of network nodes that are not neighbors, tunnel security is established between the pair of network nodes using tunnel encryption keys derived by the pair of network nodes on an ad hoc basis. The tunnel encryption keys are used to form the connection between non-neighboring network nodes so as to avoid the hop-by-hop encryption/decryption used in conventional multi-hop wireless systems.

20 Claims, 7 Drawing Sheets

SYSTEM AND METHOD FOR SECURE WIRELESS MULTI-HOP NETWORK FORMATION

RELATED APPLICATIONS

This application claims the benefit of U.S. Provisional Patent Application No. 60/807,567 filed on Jul. 17, 2006, which is hereby incorporated by reference in its entirety.

FIELD OF THE INVENTION

The invention relates to wireless multi-hop networks.

BACKGROUND OF THE INVENTION

In existing multi-hop wireless networks, whether in a WLAN (wide large area network) mesh network or WiMAX (Worldwide Interoperability for Microwave Access) 802.16J multi-hop network, encryption/decryption of the data traffic is performed on a hop-by-hop basis in accordance with IEEE 802.11i and IEEE 802.16 PKMv2.

The hop-by-hop encryption/decryption adds significant complexity to encryption key distribution and encryption key wrapping. It may take a significant delay, measured, for example, on the order of hundreds of milliseconds for each party to be authenticated and to complete encryption key distribution. Some other solutions involve Ad-hoc Diffie-Hellman (RSA PKCS #3) authentication. These solutions have the inherent limitation of a lack of scalability.

Existing solutions are based on centralized key distribution in which each device has encryption key pairs for use with only a centralized authenticating node. This entails that traffic goes through the centralized authenticator regardless of whether there exists an optimum path for the traffic, which does not include the centralized authenticating node.

SUMMARY OF THE INVENTION

According to a first aspect of the invention, there is provided a method comprising: in a multi-hop wireless network comprising a plurality of network nodes, establishing pair-wise security between pairs of neighbouring network nodes; for at least one pair of network nodes that are not neighbours, establishing security between the pair of network nodes that are not neighbours using tunnel encryption keys derived by the pair of network nodes that are not neighbours on an ad hoc basis.

In some embodiments, for communication between two end user devices connected to neighbouring network nodes, using the established pair-wise security; and for communication between two end user devices that are connected to any of the at least one pair of network nodes that are not neighbours, using the tunnel encryption keys.

In some embodiments, establishing pair-wise security between pairs of neighbouring network nodes comprises establishing pair-wise encryption keys that change periodically.

In some embodiments, establishing encryption keys that change periodically comprises: updating pair-wise encryption keys between pairs of neighbouring network nodes at the expiry of a timer that defines a period of the pair-wise encryption keys being valid.

In some embodiments, the method further comprises: the plurality of network nodes performing a negotiation process to determine which at least one network node is to be an authenticating node for performing authentication of nodes in the network and which network nodes are supplicant nodes to be authenticated.

In some embodiments, the method further comprises the authenticating node authenticating at least one supplicant node.

In some embodiments, authenticating at least one supplicant node comprises: the authenticating node using a server provisioned to aid in the authenticating of network nodes.

In some embodiments, the method further comprises the server providing pair-wise master keys (PMKs) to the network nodes during the authenticating of the network nodes.

In some embodiments, the method further comprises when authenticating the at least one supplicant node, distributing pair-wise master keys (PMKs) to both the supplicant node and the authenticating node.

In some embodiments, the method further comprises deriving at least one of: pair-wise encryption keys for unicast; and pair-wise encryption keys for multicast/broadcast from pair-wise master encryption keys.

In some embodiments, establishing security between the pair of non-neighbouring network nodes using tunnel encryption keys further comprises a first network node of the pair of non-neighbouring network nodes determining a routing path through the network to the second network node of the pair of non-neighbouring network nodes.

In some embodiments, the method further comprises continuously employing the tunnel encryption keys, once established, for any traffic destined between the pair of non-neighbouring network nodes for as long as the tunnel encryption keys are valid.

In some embodiments, establishing security between the pair of non-neighbouring network nodes using tunnel encryption keys comprises using encryption keys that are based on one or both of a pre-shared key scheme and a public key scheme.

According to a second aspect of the invention, an apparatus comprising: transmitting circuitry and receiving circuitry configured for communicating with at least one network node; a pair-wise security module configured to establish pair-wise security between neighbouring network nodes; a tunnel key security module configured to establish security between non-neighbouring network nodes using tunnel encryption keys on an ad hoc basis.

In some embodiments, the apparatus further comprises a negotiator configured to negotiate whether the apparatus is an authenticating node for performing authentication of network nodes in a network or is a supplicant node that is to be authenticated.

In some embodiments, when the apparatus is an authenticating node, the apparatus further comprises an authenticator for authenticating supplicant nodes.

In some embodiments, the authenticator communicates with a server that provides pair-wise master keys (PMKs) to the network nodes.

In some embodiments, the pair-wise security module further comprises: a pair-wise encryption key generator configured to derive encryption keys for a neighbouring network node based on pair-wise master keys (PMKs) provided to the apparatus.

In some embodiments, the tunnel key security module further comprises a tunnel encryption key generator configured to derive tunnel encryption keys for communication with a non-neighbouring network node.

In some embodiments, the apparatus further comprises a nonce adder configured to add a random number to a packet being sent to another network node.

Other aspects and features of the present invention will become apparent to those ordinarily skilled in the art upon review of the following description of specific embodiments of the invention in conjunction with the accompanying figures.

BRIEF DESCRIPTION OF THE DRAWINGS

Embodiments of the invention will now be described with reference to the attached drawings in which.

DETAILED DESCRIPTION OF EMBODIMENTS OF INVENTION

In a multi-hop network architecture, one or more network nodes may be located between end user devices that communicate over the network. Therefore, packets sent over the network between two end user devices may travel over multiple hops from network node to network node.

Network nodes may be installed inside of a building (e.g., subway tunnel), on a roof top of a building or a residential house, on an radio tower, on a mobile vehicle platform (e.g., trains, buses, ferries), on aerial-based platforms, or even possibly carried by soldiers in the battlefield. This is not an exhaustive list of applications and/or locations for the network nodes.

In some situations, an end user device is a mobile station (MS). The end user device may migrate over time and as a result use different network nodes to access the network at different times. Some examples of devices that may be considered to be an end user device are a cellular telephone, a computer having a wireless modem, and a wireless enabled PDA (Personal Data Assistants).

In some embodiments of the present invention there are provided protocols for use with a wireless multi-hop network architecture. In some embodiments the wireless multi-hop network architecture is a wireless mesh architecture. Implementation of embodiments of the invention on other multi-hop network architectures is also contemplated.

A first phase utilized in some embodiments of the invention provides a method for authenticating network nodes and establishing encryption keys between pairs of network nodes. A second phase utilized in some embodiments of the invention provides a method for generating and using tunnel encryption keys enabling one hop encryption between two non-neighbouring network nodes, which would otherwise require hop-by-hop encryption between pairs of neighbouring network nodes along a path between the two non-neighbouring network nodes.

According to some embodiments of the invention, tunnel encryption keys are employed, for which the tunnel ends are the identified source and destination network nodes in the context of a wireless multi-hop network, such as a WiMESH or WiMAX IEEE 802.16J network.

The scheme also works in overlapping administrative hotspot environments. For example, when access points belonging to different network operators are located in proximity such that the networks overlap, or that the network nodes are collocated, pair-wise security can be established between the access points and tunnel encryption keys can be established between non-neighbouring access points across the two networks.

In some embodiments of the invention, methods and devices described herein enable some or all of the following features:

dynamic generation of ephemeral session encryption keys;
reduced susceptibility to passive, active and/or replay attack; and
some level of denial-of-service (DoS) resistance.

Figure 1:
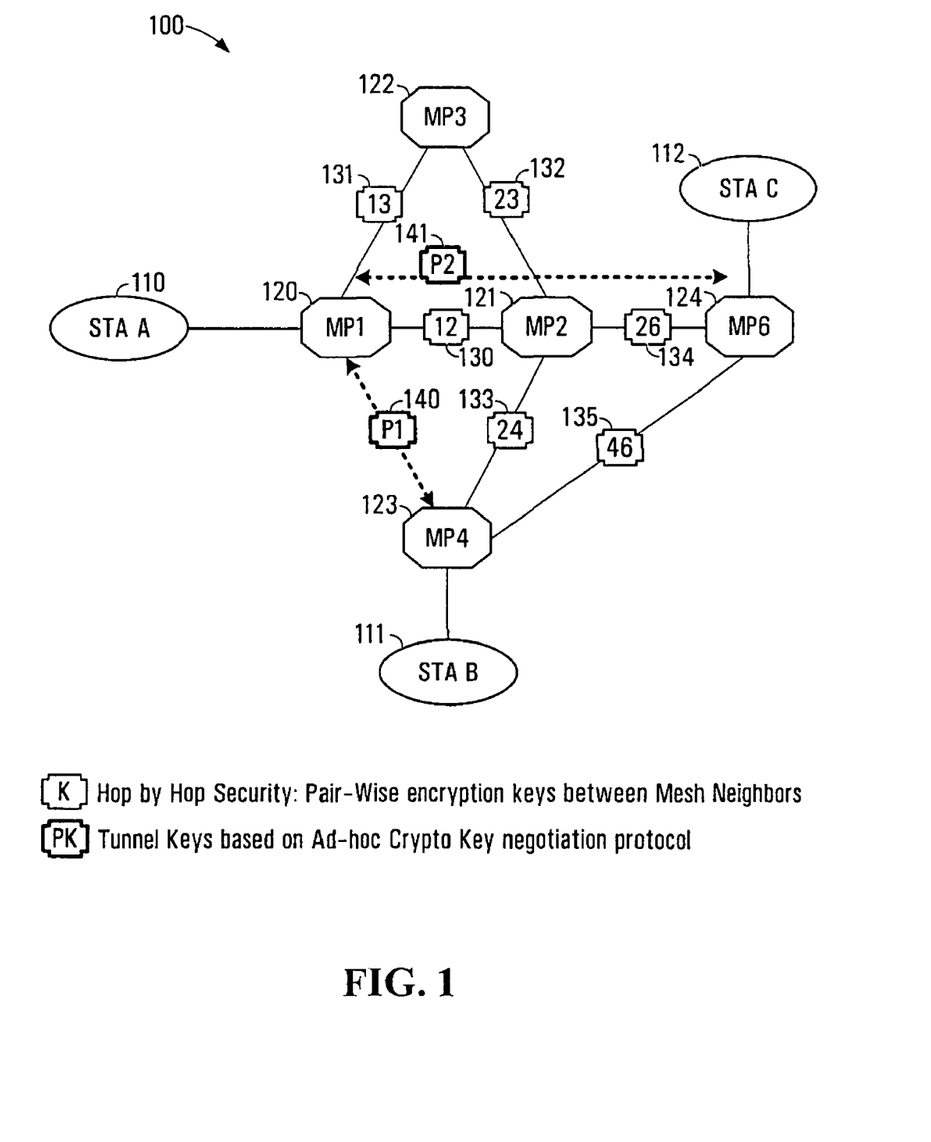
FIG. 1 is a schematic diagram of a network implementing tunnel key encryption according to an embodiment of the invention.

FIG. 1 illustrates an example of a multi-hop network 100 on which embodiments of the invention may be implemented. The particular architecture of FIG. 1 is a mesh network. FIG. 1 includes three end user devices STA A 110, STA B 111 and STA C 112, each respectively coupled to a network node, which is a network access point (AP) of the multi-hop network 100. The multi-hop network 100 includes five APs, identified in FIG. 1 as MP1 by reference character 120, MP2 by reference character 121, MP3 by reference character 122, MP4 by reference character 123 and MP6 by reference character 124. The acronym MP stands for mesh point, which indicates an access point in the multi-hop network 100. In the illustrated example, for the particular configuration shown, STA A 110 accesses the network via MP1 120, STA B 111 accesses the network via MP4 123 and STA C 112 accesses the network via MP6 124. However, it is to be understood that FIG. 1 represents the configuration at a given point in time and that the end user devices may migrate and access different APs at other times. In the example of FIG. 1, MP1 and MP2, MP1 and MP3, MP2 and MP3, MP2 and MP4, MP2 and MP6, MP4 and MP6 are neighbouring node pairs, and MP1 and MP4, MP1 and MP6, MP3 and MP4, MP3 and MP6 are not. A pair of nodes is a pair of neighbouring nodes when they have direct wireless contact over a single hop. A pair of nodes is non-neighbouring when traffic transmitted between the pair of nodes must traverse at least N hops, N>=2 (i.e. via N−1 nodes) between the pair of nodes.

The number of APs, the number of end user devices communicating with a particular AP (for example only a single end user device is communicating with MP1, MP4 and MP6, respectively in FIG. 1), and the configuration of how the APs are located and coupled in radio contact to other APs in the network architecture are all implementation specific.

In operation, there are two phases. In a first phase, the APs negotiate their role in the network in terms of whether they are a supplicant node or an authenticating node. The role of the supplicant node is a passive one, in which the supplicant node sends packets over the network to a given destination. The role of the authenticating node is a more active role that involves performing authentication of supplicant nodes that are authorized network nodes in the network. The authenticating node may also send packets over the network. During the authentication process, encryption keys are derived for use between neighbouring network nodes.

In a second phase, once the encryption keys are established for neighbouring APs, tunnel encryption keys are established between non-neighbouring APs on an ad hoc basis. In this context, "ad hoc" refers to the non-neighbouring APs being able to organise themselves arbitrarily, including for example, using whatever protocols are appropriate to establish the tunnel encryption keys.

Figure 2:
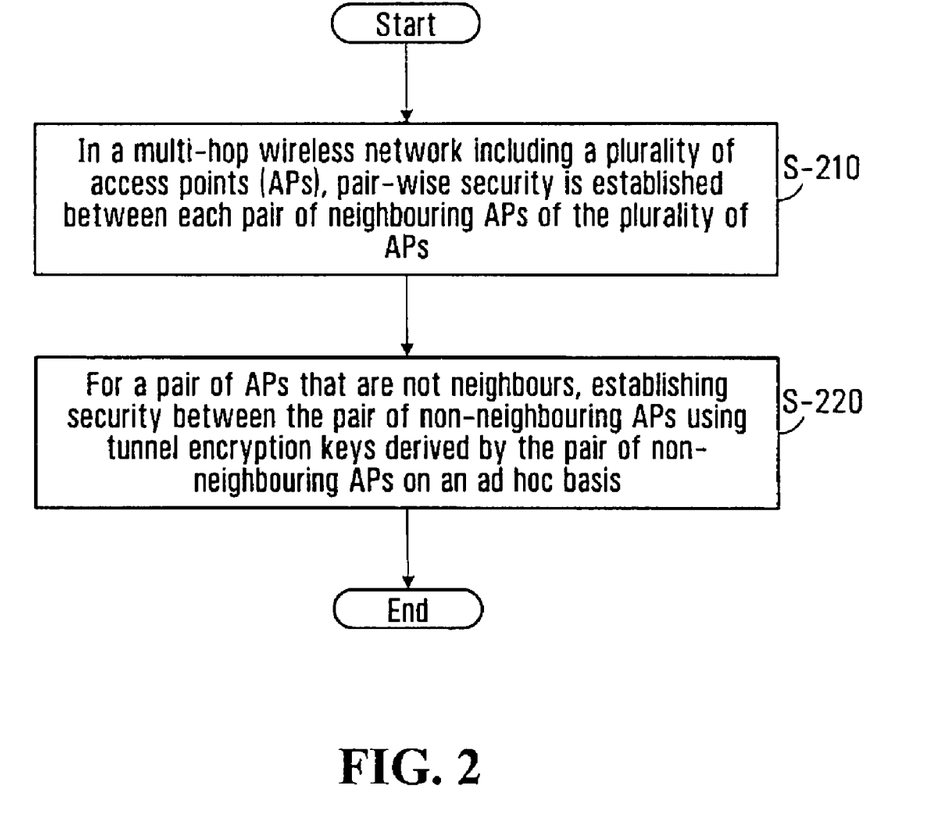
FIG. 2 is a flow chart showing a method for establishing pair-wise security between neighbouring nodes and determining tunnel encryption keys between non-neighbouring nodes in a network architecture according to an embodiment of the invention.

A method for implementing pair-wise encryption key establishment and network node authentication and then determining tunnel encryption keys may be generally described with regard to FIG. 2 as follows. In a first step S-210, in a multi-hop wireless network including a plurality of APs, pair-wise security is established between pairs of neighbouring APs of the plurality of APs. For example, pair-wise security is established in the form of temporal pair-wise encryption keys. Following establishing pair-wise security between each pair of neighbouring APs, in a second step S-220, for a pair of APs that are not neighbours, tunnel security is established between the non-neighbouring pair of APs using tunnel encryption keys derived by the non-neighbouring pair of APs on an ad hoc basis.

Each of the two steps S-210 and S-220 will be described in further detail below as Phase I and Phase II respectively with reference to FIGS. 3 and 4.

Phase I: Pair-Wise Key Establishment and Authentication

An example method of pair-wise key establishment and authentication will now be described with reference to FIG. 3.

Figure 3:
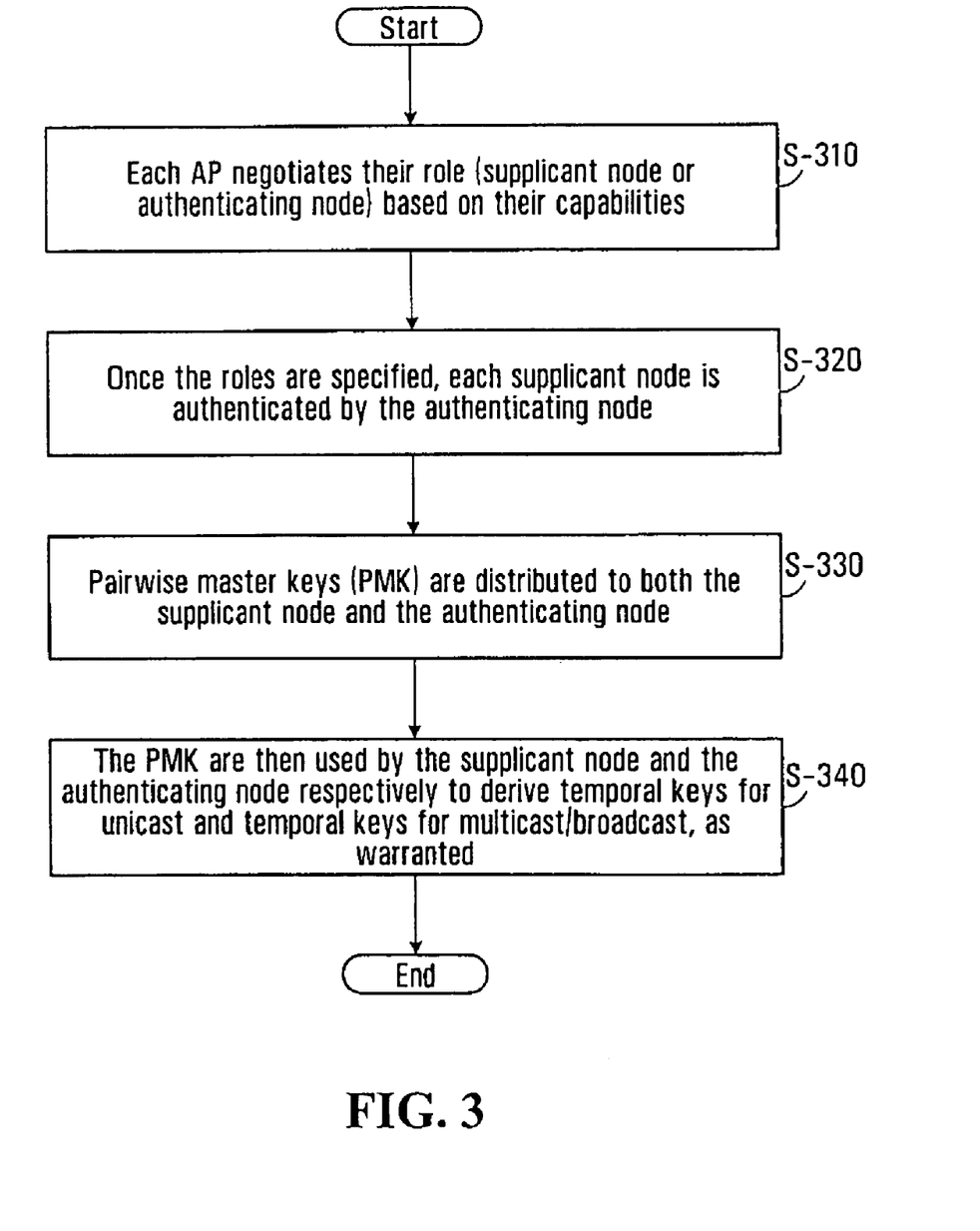
FIG. 3 is a flow chart showing a method for authenticating network nodes in a network architecture and establishing pair-wise encryption keys between neighbouring nodes according to an embodiment of the invention.

FIG. 3 illustrates a flow chart in which in a first step S-310, each AP negotiates their role (supplicant node or authenticating node) based on their capabilities. In some implementations, an AP may be provisioned to be an authenticating node. For example, the AP may be equipped with particular hardware and/or access to a server, such as a Remote Authentication Dial In User Service (RADIUS) server, that enables it to act as an authenticating node. In other embodiments, when the APs are provisioned in a similar fashion, the negotiation process selects an AP to act as the authenticating node randomly or based on some particular criterion.

For the purpose of the example of FIG. 1, MP2 121 is provisioned such that negotiation between the APs results in MP2 121 being selected as the authenticator role, while MP1 120, MP3 122, MP4 123 and MP6 124 each assume the supplicant node role.

In implementations that include a server that aids in authenticating, the server may be located remotely from the authenticating node or collocated with the authenticating node.

In some embodiments, the negotiation process occurs when an AP joins a network or when the network is originally configured for operation. In other embodiments, the negotiation process is a result of some other trigger, such as following a system failure or upon instruction from a network administrator. In a particular example, the negotiation process may be achieved through update messages between neighbouring APs (i.e. Probe-request, Beacon, etc).

In a second step S-320, once the roles are specified, each supplicant node is authenticated by the authenticating node, for example via an Extensible Authentication Protocol (EAP) message.

In a third step S-330, pair-wise master keys (PMK) are distributed to both the supplicant node and the authenticating node. In a particular example, a RADIUS server distributes the PMK to the supplicant node and the authenticating node.

In a fourth step S-340, the PMK are then used by the supplicant node and the authenticating node respectively to derive temporal keys for unicast and temporal keys for multicast/broadcast, as warranted. This may for example take place using four way hand-shake messages. Examples of pair-wise encryption keys are illustrated in FIG. 1 labeled as "12" 130, "13" 131, "23" 132, "24" 133, "26" 134 and "46" 135, which are each associated with a respective link between mesh neighbours.

More generally, any mechanism of establishing pair-wise keys can be employed. The pair-wise keys may change over time.

In some embodiments, the pair-wise encryption keys are refreshed in response to the expiry of a timer associated with the pair-wise keys. In a particular implementation, each pair of neighboring nodes having pair-wise encryption keys are synchronized to a timer. At the expiration of the timer the authentication process for the neighbouring nodes is repeated. In some embodiments, when multiple pair-wise keys are established between a pair of neighbouring nodes, some pair-wise encryption keys may be synchronized to a different timer than other pair-wise encryption keys for use between the same neighbouring nodes.

Phase II: Tunnel Key Establishment

An example method of tunnel key establishment will now be described with reference to FIG. 4.

Figure 4:
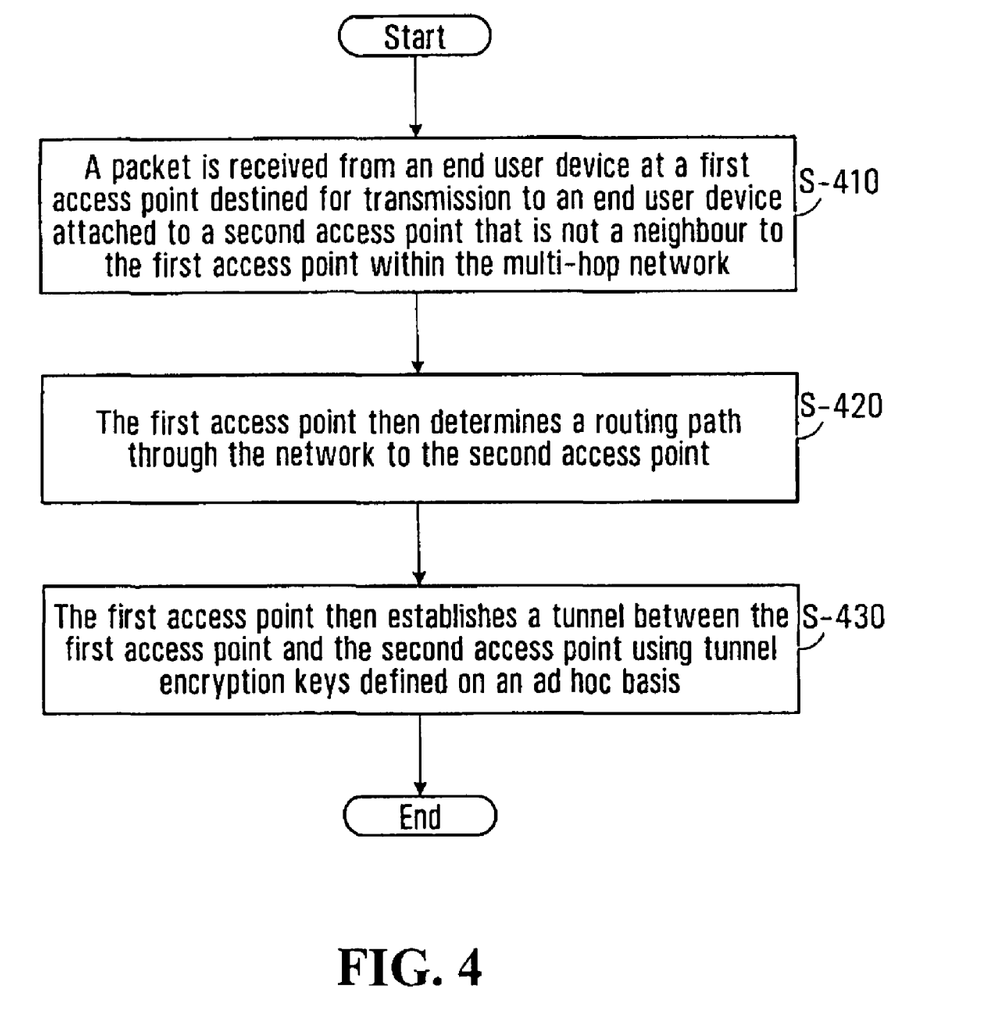
FIG. 4 is a flow chart showing a method for determining tunnel encryption keys between non-neighbouring nodes in a network architecture according to an embodiment of the invention.

FIG. 4 illustrates a flow chart in which in a first step S-410, a packet is received from an end user device at a first access point destined for transmission to an end user device attached to a second access point that is not a neighbour to the first access point within the multi-hop network. For the example, with reference to FIG. 1, MP1 120 may receive a packet from STA A 110 destined for STA B 111 via MP4 123. MP1 120 and MP4 123 are riot mesh neighbours. MP1 120 identifies a particular route to STA B 111 is via MP2 121 and MP4 123, where MP2 121 is the immediate node to MP1 120. MP2 121 is also the authenticator in this example.

In a second step S-420, the first access point then determines a routing path through the network to the second access point. For the example, with reference to FIG. 1, MP1 120 determines a routing path from MP1 120 to MP4 123 to be MP1 to MP2 to MP4. Determining a routing path may be performed by any appropriate manner.

In a third step S-430, the first access point then initiates a tunnel between the first access point and the second access point to establish tunnel encryption keys defined on an ad hoc basis. In some embodiments, initiating the tunnel between the first access point and the second access point to establish tunnel encryption keys involves the first access point starting a handshake process with the second access point which enables the first and second access points to establish the tunnel encryption keys.

These encryption keys allow encryption/decryption to be performed between the first and second access points without encryption/decryption being performed for each pair of access points along the routing path.

In FIG. 1, the authenticating node MP2 121 happens to be in the tunnel path between MP1 120 and MP4 123. However, having the tunnel path routed through the authenticating node is not necessary in all situations. Once the tunnel encryption key is established for non-neighbouring network nodes, the tunnel does not have to go through the authenticating node. However, initially establishing tunnel encryption keys does involve routing through the authenticating node in order to provide TTP (Trusted Third Party) authentication.

In some embodiments the tunnel encryption keys are initiated on a demand basis. For example, tunnel encryption keys are generated between non-neighbouring nodes as needed i.e. when a network node, on behalf of an end-user with which it is in wireless communication, is sending a packet to a particular non-neighbouring node. In some embodiments, the tunnel encryption keys, once established, will be continuously employed for any traffic destined between these two nodes for as long as the tunnel encryption keys are valid. For example, the tunnel encryption keys may be valid until a timer that defines the period of validity expires. In some embodiments, this timer is synchronized with the timer defining the validity of pair-wise encryption keys.

While the above example has been described with regard to a routing path through a single network, it is to be understood that when two or more networks overlap, a routing path between two end user devices may occur over multiple networks.

For communication between two end user devices, which are each respectively connected to neighbouring APs, the pair-wise security is used for encryption/decryption between the neighbouring APs. For communication between two end user devices, which are each respectively connected to non-neighbouring multi-hop APs, the tunnel encryption keys are used for encryption/decryption between the non-neighbouring multi-hop APs.

In some embodiments, an encrypted packet includes a nonce. A nonce is a random number attached to the packet to provide additional security for the system. The use of the nonce for example, mitigates replay attacks. Since a nonce is a random number added to the packet, each packet with the same content, for example a packet being resent, will have a different random number. Therefore, multiple messages being received with the same content and the same nonce indicate that the same exact packet has been received. This may be an indication that an attacker has intercepted packets and is sending those same packets to the receiver, for example in the form of a replay attack. In some embodiments, the use of the nonce enables the ability to detect a replay attack and provides an additional level of security for the system.

Based on a selected type of key exchange mechanism, keys are derived for a tunnel between non-neighbouring access points. The tunnel encryption key derived between MP1 120 and MP4 123 is indicated in FIG. 1 by "P1" 140. An example of a type of key exchange mechanism is the RSA mechanism, which involves a pair of public and private encryption keys. In some embodiments, the public encryption keys and private encryption keys are then used for both encryption and providing a digital signature. For the illustrated example of FIG. 1, STA A 110 communicates with STA B 111 across the links MP1-MP2 and MP2-MP4. The tunnel keys "P1" 140 are used to form the connection between MP1 120 and MP4 123 without the need to perform hop-by-hop encryption/decryption using the link based keys "12" 130 and "24" 133 on a hop-by-hop basis.

Tunnel keys "P2" 141 are shown for a tunnel between MP1 120 and MP6 124 that would allow STA A 110 to communicate with STA C 112.

Figure 5:
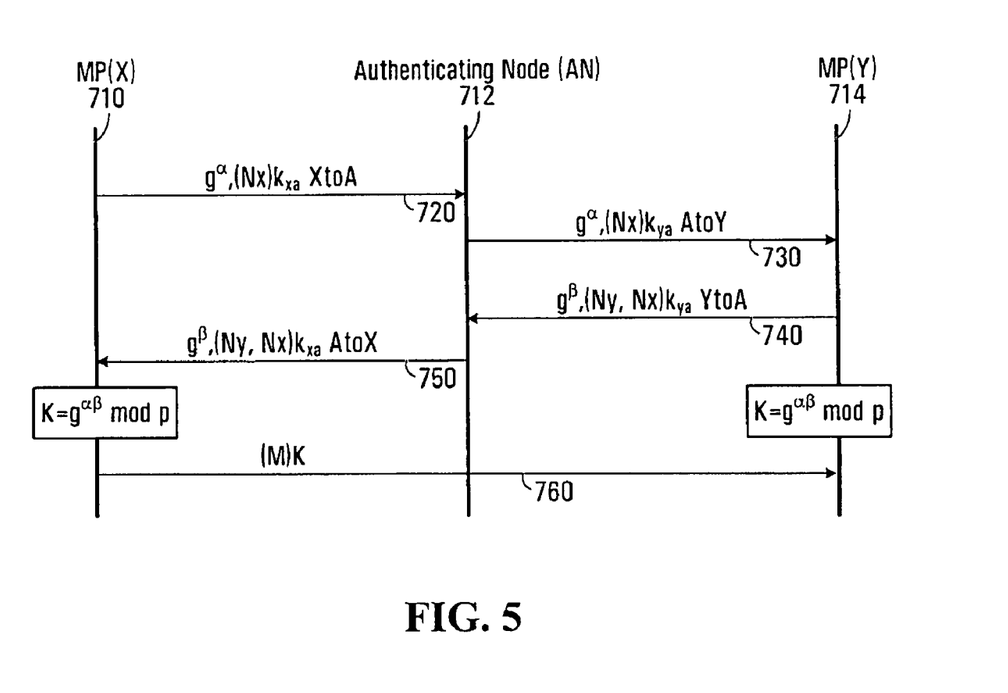
FIG. 5 is a signal flow diagram of an example of establishing tunnel encryption keys according to an embodiment of the invention.

An example of how tunnel encryption keys are established when using an authenticating node as a Trusted Third Party will now be described with reference to FIG. 5. FIG. 5 is a signal flow diagram for messages being communicated between two non-neighbouring network nodes, MP(X) 710 and MP(Y) 714, via the authenticating node (AN) 712.

In the messages described below, the following notation is used:

$g^c$ is a Diffie-Hellman public value for c (mod p is implied);
{R}s is encryption of parameter or traffic R with key s;
Ni is a pseudo-random number (nonce) selected by node I;
K is a key-encrypting key derived from the Diffie-Hellman values from non-neighbouring nodes; and
$k_{ij}$ is the pair-wise key existing between nodes I and J.

Furthermore, the use of "x", "y" and "a" in the notation of FIG. 5 refers to node MP(X) 710, node MP(Y) 714 and the authenticating node AN 712, respectively.

In a first message 720, MP(X) 710 initiates a handshake to the AN 712 by providing $g^\alpha$ and nonce Nx, encrypted with a pre-established key $k_{xa}$ (key for MP(X) 710 to AN 712), along with other parameters, indicated by "XtoA".

In a second message 730, AN 712 forwards some of the parameters received from the first message 720 to MP(Y) 714. AN 712 encrypts the nonce Nx with pre-established key $k_{ya}$ (key for MP(Y) 714 to AN 712). The newly encrypted nonce Nx is used to mitigate replay and intercept attack.

In a third message 740, MP(Y) 714 responds to the second message 730 by providing AN 712 with $g^\beta$ and nonces Nx and Ny, encrypted with a pre-established key $k_{ya}$, along with other parameters, indicated by "YtoA".

In a fourth message 750, AN 712 forwards some of the parameters received from the third message 740 to MP(X) 710. AN 712 encrypts the nonces Nx and Ny with pre-established key $k_{xa}$.

Upon receipt of both $g^\alpha$ and $g^\beta$, the non-neighbouring nodes MP(X) 710 and MP(Y) 714 are each able to derive the tunnel encryption key K based on Diffie-Hellman algorithm. The tunnel encryption key is indicated as $g^{\alpha\beta}$ mod p in FIG. 5. Traffic can then be transmitted between MP(X) 710 and MP(Y) 714, as indicated at by {M}K 760, in which "M" is a message, or more generally traffic between the nodes, and K is the derived tunnel encryption key for encrypting the message.

The receiving node can decrypt the message having knowledge of the tunnel encryption key.

In the above description, nodes in the mesh network architecture are referred to as access points. However, more generally the nodes that are included in the network can be referred to as simply network nodes, as not all of such nodes will necessarily be used for accessing the network. Furthermore, the network nodes may also be configured for mobility so that they can move within the network or between networks. In some embodiments, when a network node moves within a network, the tunnel encryption keys between non-neighbouring nodes may still be valid.

Figure 6:
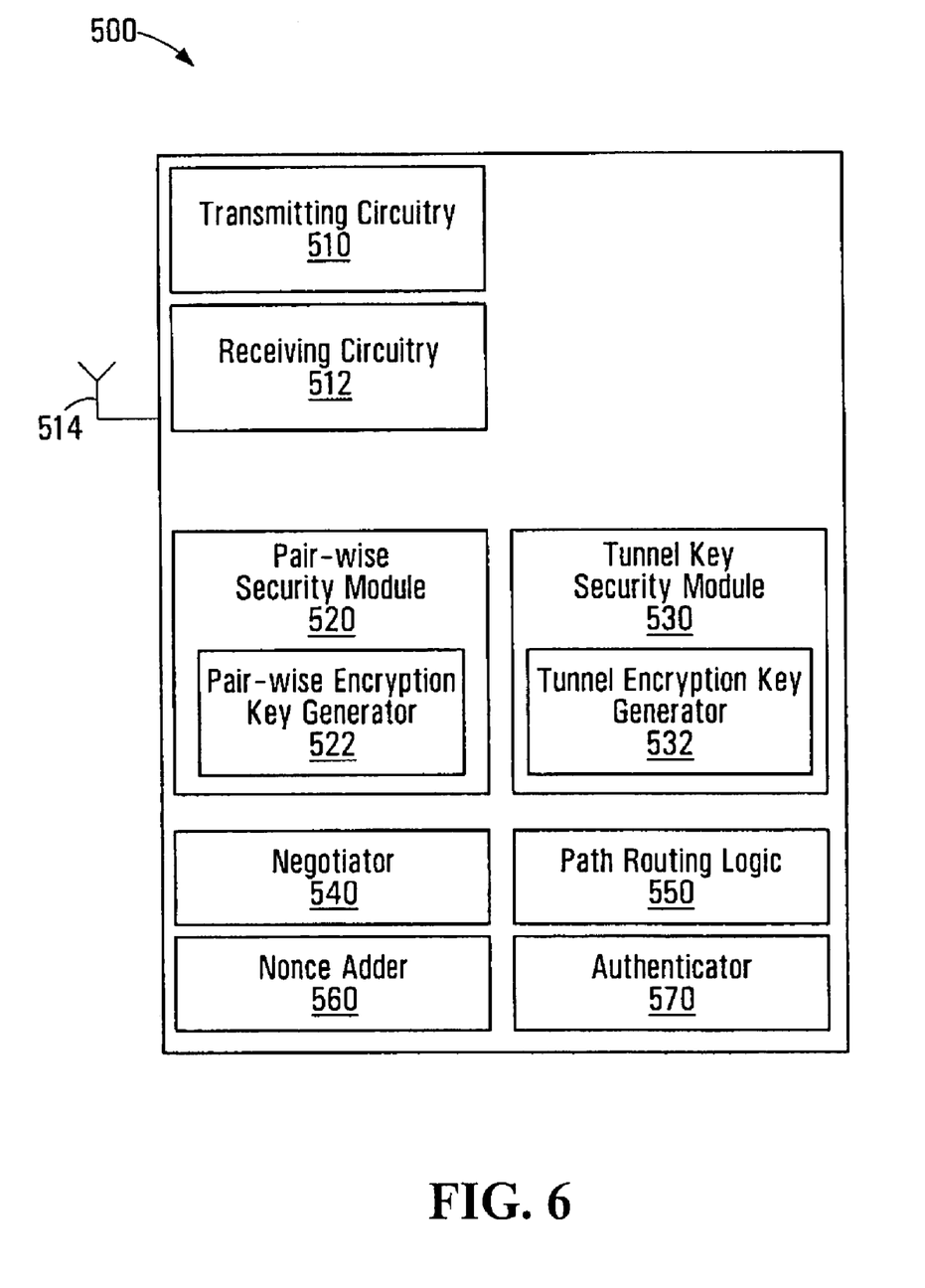
FIG. 6 is a block diagram of an example network node according to an embodiment of the invention.

An example of a network node will now be described with reference to FIG. 6. A network node indicated at 500 includes transmitting circuitry 510 and receiving circuitry 512. The transmitting circuitry 510 and receiving circuitry 512 are coupled to an antenna 514 (not shown) for transmitting to other network nodes or end user devices. In some embodiments, the network node 500 includes more than one antenna (not shown), for example for use in a MIMO (multiple input multiple output) configuration. In some embodiments, the network node 500 includes more than one antenna, and one or more antennas are used for communication with other network nodes and one or more antennas are used for communicating with end user devices.

More generally, the network node includes whatever antennas, receiving and transmitting circuitry and other hardware or software elements that are typically used for setting up, maintaining and communicating over the multi-hop network, in addition to that which is defined herein.

The network node 500 includes a pair-wise security module 520 configured to establish pair-wise security between neighbouring network nodes. The network node further includes a tunnel key security module 530 configured to establish security between non-neighbouring network nodes using tunnel encryption keys on an ad hoc basis.

The pair-wise security module 520 configured to establish pair-wise security between neighbouring network nodes includes an encryption key generator 522 configured to derive temporal encryption keys for a neighbouring network node based on PMKs provided to the network node.

The tunnel key security module 530 includes a tunnel encryption key generator 532 configured to derive tunnel encryption keys with a non-neighbouring network node on an ad hoc basis.

The network node 500 includes a negotiator 540 configured to negotiate whether the apparatus is an authenticating node for performing authentication of network nodes in a network or is a supplicant node which needs to be authenticated. The negotiator 540 is shown as a separate block from the pair-wise security module 520, but in some embodiments this logic may be included as a part of the pair-wise security module 520. In other embodiments, the pair-wise security module 520 may call upon a negotiator used for negotiating other functionality between nodes and apply the negotiator specifically to the task of negotiating whether the apparatus is an authenticating node or is a supplicant node.

In some embodiments, the network node 500 includes path routing logic 550 for determining a routing path between non-neighbouring network nodes. The path routing logic 550 is shown as a separate block from the tunnel key security module 530, but in some embodiments this logic may be included as a part of the tunnel key security module 530.

In some embodiments, the network node 500 includes a nonce adder 560 for adding a random number to a packet to mitigate replay attack. The nonce adder 560 may be called upon by either the pair-wise security module 520 or the tunnel key security module 530, depending on whether the network node is communicating with a neighbouring network node using pair-wise encryption keys or a non-neighbouring network node using tunnel keys.

When the network node 500 is an authenticating node, the apparatus may further include an authenticator 570 configured for authenticating supplicant nodes. In some embodiments, authenticating supplicant nodes includes communicating with a server that provides pair-wise master keys (PMKs) to the network nodes, for example a RADIUS server. The authenticator 570 is shown as a separate block from the pair-wise security module 520, but in some embodiments this logic may be included as a part of the pair-wise security module 520.

In some embodiments, the various types of logic are implemented by computer readable programmable code instructions stored on a computer readable medium in the network node 500. As such, the logic blocks in FIG. 5 are one or more computer algorithm for implementing the functionality of the logic blocks. However, other implementations are possible. For example, the functionality of the logic blocks may be implemented as software, hardware, firmware, or as any appropriate combination thereof.

The network node 500 includes other hardware and/or software for performing other functions, such as connecting to the network, synchronization, etc., which are not described herein.

Figure 7:
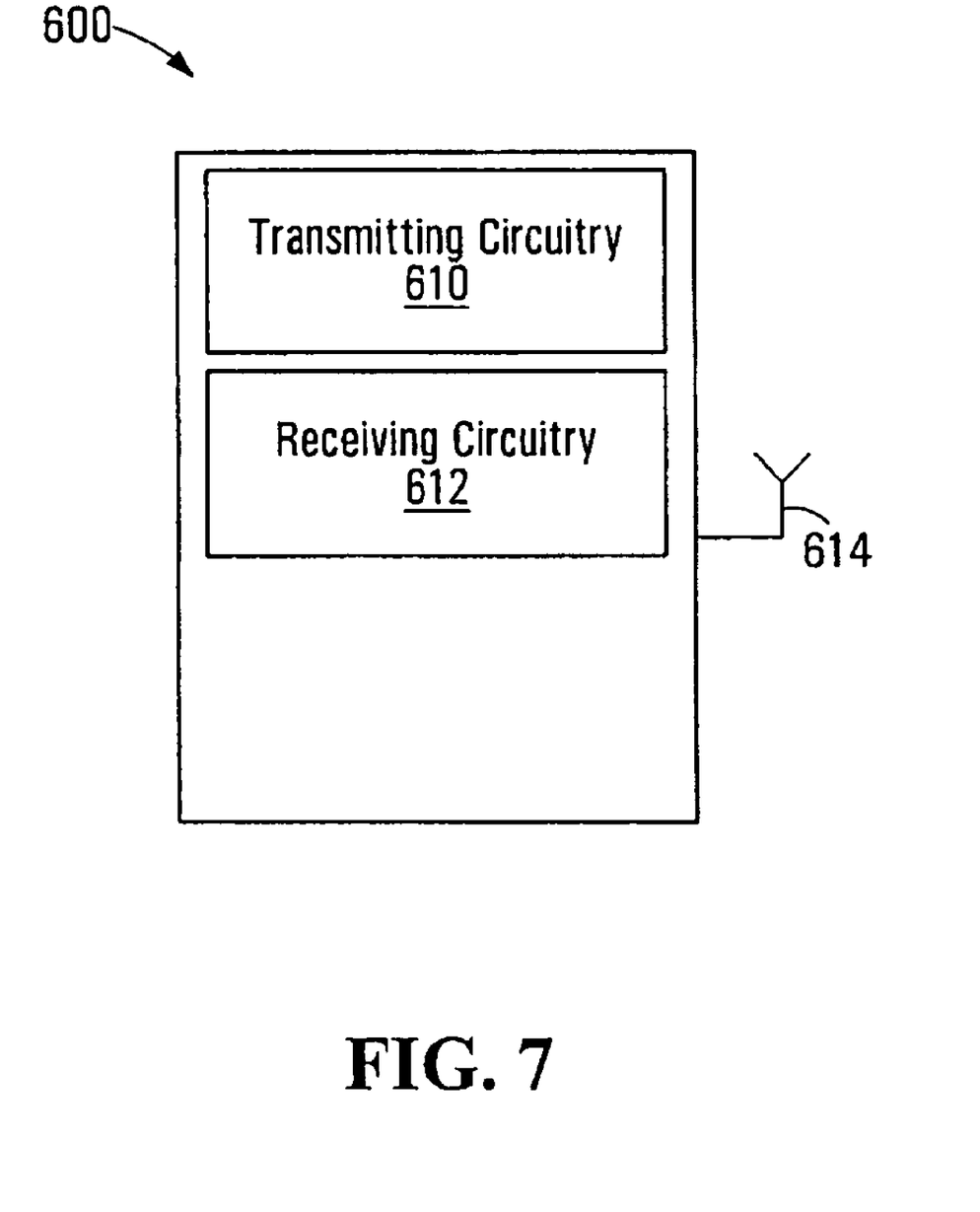
FIG. 7 is a block diagram of an example end user device for communicating with a network node according to an embodiment of the invention.

An example of an end user device will now be described with regard to FIG. 7. An end user device indicated at 600 includes transmitting circuitry 610 and receiving circuitry 612 for communicating with a network node. The network node being configured to: establish pair-wise security between neighbouring network nodes; and establish security between non-neighbouring network nodes using tunnel encryption keys on an ad hoc basis. The transmitting circuitry 610 and receiving circuitry 612 is coupled to an antenna 614 for transmitting to network nodes. In some embodiments, the network node 600 includes more than one antenna (not shown), for example for use in a MIMO configuration.

The end user device 600 includes other hardware and/or software for performing other functions, such as connecting to the network, synchronization, user interface etc., which are not described herein.

Numerous modifications and variations of the present invention are possible in light of the above teachings. It is therefore to be understood that within the scope of the appended claims, the invention may be practiced otherwise than as specifically described herein.

The invention claimed is:

1. A method comprising:
   in a multi-hop wireless network comprising a plurality of network nodes, establishing pair-wise security between pairs of neighbouring network nodes;
   for at least one pair of network nodes that are not neighbours, establishing security between the pair of network nodes that are not neighbours using tunnel encryption keys derived by the pair of network nodes that are not neighbours on an ad hoc basis.

2. The method of claim 1 wherein:
   for communication between two end user devices connected to neighbouring network nodes, using the established pair-wise security;
   for communication between two end user devices that are connected to any of the at least one pair of network nodes that are not neighbours, using the tunnel encryption keys.

3. The method of claim 1 wherein establishing pair-wise security between pairs of neighbouring network nodes comprises establishing pair-wise encryption keys that change periodically.

4. The method of claim 3 wherein establishing encryption keys that change periodically comprises:
   updating pair-wise encryption keys between pairs of neighbouring network nodes at the expiry of a timer that defines a period of the pair-wise encryption keys being valid.

5. The method of claim 1 further comprising:
   the plurality of network nodes performing a negotiation process to determine which at least one network node is to be an authenticating node for performing authentication of nodes in the network and which network nodes are supplicant nodes to be authenticated.

6. The method of claim 5 further comprising:
   the authenticating node authenticating at least one supplicant node.

7. The method of claim 6 wherein authenticating at least one supplicant node comprises:
   the authenticating node using a server provisioned to aid in the authenticating of network nodes.

8. The method of claim 7 further comprising the server providing pair-wise master keys (PMKs) to the network nodes during the authenticating of the network nodes.

9. The method of claim 6 further comprising:
   when authenticating the at least one supplicant node, distributing pair-wise master keys (PMKs) to both the supplicant node and the authenticating node.

10. The method of claim 5 further comprising:
    deriving at least one of:
    pair-wise encryption keys for unicast; and pair-wise encryption keys for multicast/broadcast from pair-wise master encryption keys.

11. The method of claim 1 wherein establishing security between the pair of non-neighbouring network nodes using tunnel encryption keys further comprises a first network node of the pair of non-neighbouring network nodes determining a routing path through the network to the second network node of the pair of non-neighbouring network nodes.

12. The method of claim 11 further comprising:
continuously employing the tunnel encryption keys, once established, for any traffic destined between the pair of non-neighbouring network nodes for as long as the tunnel encryption keys are valid.

13. The method of claim 11 wherein establishing security between the pair of non-neighbouring network nodes using tunnel encryption keys comprises using encryption keys that are based on one or both of a pre-shared key scheme and a public key scheme.

14. An apparatus comprising:
transmitting circuitry and receiving circuitry configured for communicating with at least one network node;
a pair-wise security module configured to establish pair-wise security between neighbouring network nodes;
a tunnel key security module configured to establish security between non-neighbouring network nodes using tunnel encryption keys on an ad hoc basis.

15. The apparatus of claim 14 further comprising:
a negotiator configured to negotiate whether the apparatus is an authenticating node for performing authentication of network nodes in a network or is a supplicant node that is to be authenticated.

16. The apparatus of claim 15, wherein when the apparatus is an authenticating node, the apparatus further comprising:
an authenticator for authenticating supplicant nodes.

17. The apparatus of claim 16, wherein the authenticator communicates with a server that provides pair-wise master keys (PMKs) to the network nodes.

18. The apparatus of claim 14 wherein the pair-wise security module further comprises:
a pair-wise encryption key generator configured to derive encryption keys for a neighbouring network node based on pair-wise master keys (PMKs) provided to the apparatus.

19. The apparatus of claim 14 wherein the tunnel key security module further comprises:
a tunnel encryption key generator configured to derive tunnel encryption keys for communication with a non-neighbouring network node.

20. The apparatus of claim 14 further comprising:
a nonce adder configured to add a random number to a packet being sent to another network node.

* * * * *